(12) United States Patent
Norman et al.

(10) Patent No.: US 6,588,541 B2
(45) Date of Patent: Jul. 8, 2003

(54) SOFT-DISABLE DAMPING FOR ELECTRIC POWER STEERING

(75) Inventors: Mark A. Norman, Saginaw, MI (US); Julie A. Kleinau, Bay City, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/870,042

(22) Filed: May 30, 2001

(65) Prior Publication Data

US 2002/0179362 A1 Dec. 5, 2002

(51) Int. Cl.[7] ................................................. B62D 5/04
(52) U.S. Cl. ........................................ 180/446; 701/42
(58) Field of Search ................................ 180/443, 446; 701/41, 42

(56) References Cited

U.S. PATENT DOCUMENTS

| | | | |
|---|---|---|---|
| 5,668,722 A | 9/1997 | Kaufmann et al. | 701/41 |
| 5,919,241 A * | 7/1999 | Bolourchi et al. | 701/41 |
| 5,948,030 A | 9/1999 | Miller et al. | 701/41 |
| 6,039,144 A | 3/2000 | Chandy et al. | 180/443 |
| 6,112,845 A * | 9/2000 | Oyama et al. | 180/446 |
| 6,148,951 A * | 11/2000 | Nishi et al. | 180/446 |
| 6,050,360 A1 | 4/2001 | Pattok et al. | 180/446 |
| 6,041,884 A1 | 3/2002 | Shimizu et al. | |
| 2001/0041957 A1 * | 11/2001 | McCann et al. | 701/41 |
| 2001/0047233 A1 * | 11/2001 | Kleinau et al. | 701/41 |
| 2002/0017421 A1 * | 2/2002 | Stevens et al. | 180/446 |

FOREIGN PATENT DOCUMENTS

| | | |
|---|---|---|
| EP | 1 228 942 A2 | 8/2002 |
| JP | 61025166 | 6/1986 |
| JP | 01083347 | 3/1989 |

* cited by examiner

Primary Examiner—Lesley D. Morris
Assistant Examiner—Matthew Luby
(74) Attorney, Agent, or Firm—Edmond P. Anderson

(57) ABSTRACT

An electric power steering system includes a motor and a soft-disable controller in signal communication with the motor for reducing the abruptly increased reaction torque felt by a driver when an assist torque is abruptly disabled.

7 Claims, 5 Drawing Sheets

SOFT-DISABLE DAMPING FOR ELECTRIC POWER STEERING

BACKGROUND

In a vehicle equipped with electric power steering ("EPS"), the steering assist torque may be provided by an electric motor coupled to a steering column or shaft. Typically, when a condition that requires an immediate shutdown occurs in such an EPS system, the assist torque provided by the motor is abruptly commanded to zero, power is removed from the transistors that drive the motor, and the system is shut down. An immediate shutdown might be triggered, for example, if the torque sensor failed or its signal was lost.

When an EPS system is shut down, the steering system typically reverts to manual steering. If the system is shut down while the EPS motor is applying a low magnitude assist torque, the shutdown may be imperceptible to the driver. However, if the system is shut down while the EPS motor is applying a moderate or higher magnitude torque, the driver may feel an abruptly increased reaction torque in the steering wheel or hand-wheel due to the sudden reduction in assist torque. The abruptly increased reaction torque results when the stored energy in the tires and steering system is released as the assist torque from the motor is instantaneously removed. Typically, the instantaneous removal of the assist torque allows the stored energy in the system to back drive the motor at moderate to high velocity for a moment. The driver feels this motion as the abruptly increased reaction torque in the steering wheel.

SUMMARY

The above described and other features are exemplified by the following Figures and Description in which an electric power steering system is disclosed that includes a motor and a soft-disable controller in signal communication with the motor for reducing the abruptly increased reaction torque felt by a driver when an assist torque is abruptly disabled.

BRIEF DESCRIPTION OF THE DRAWINGS

Referring now to the Figures wherein like elements are numbered alike.

DESCRIPTION OF PREFERRED EMBODIMENTS

A soft-disable controller for an electric power steering ("EPS") system performs a controlled shutdown of the assist motor while mitigating the abruptly increased reaction torque in the steering wheel.

Figure 1:
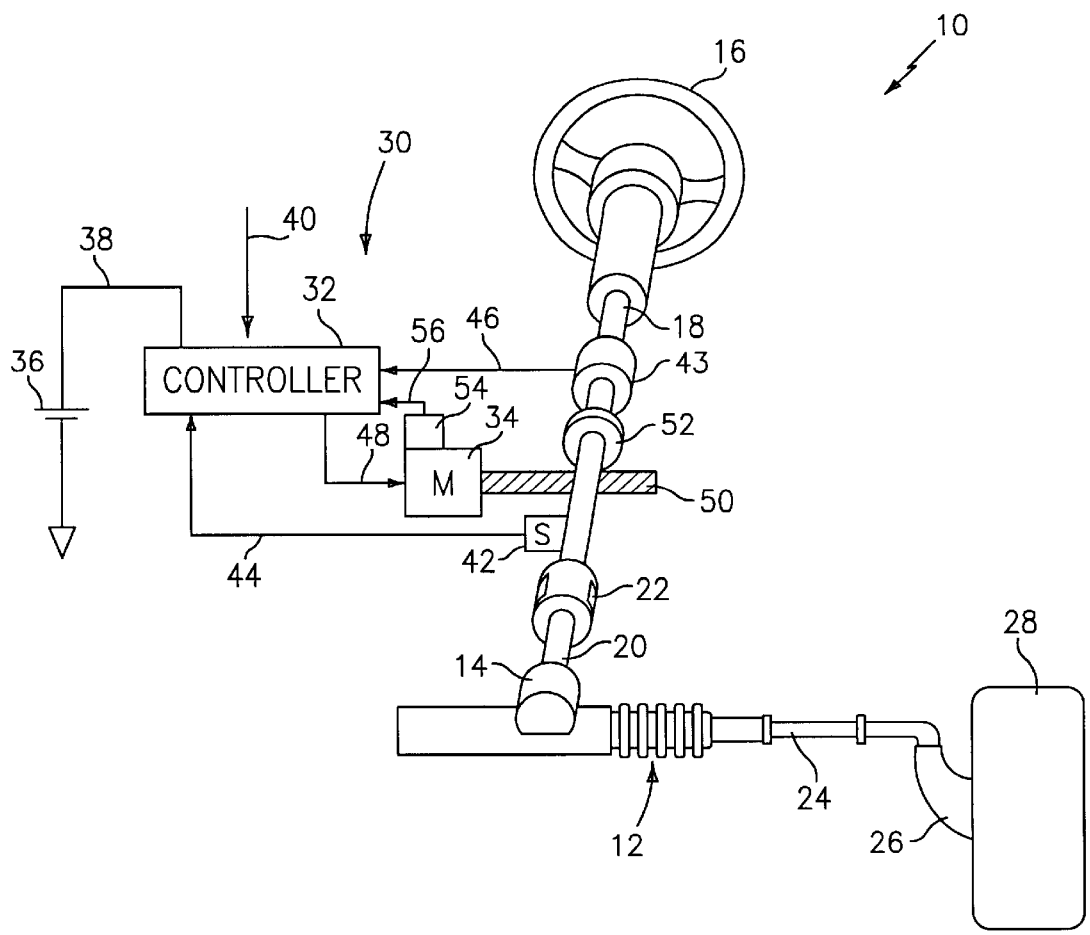
FIG. 1 is a schematic diagram of an electric power steering system having a soft-disable controller.

Referring to FIG. 1, reference numeral 10 generally indicates an EPS system for a motor vehicle. A steering mechanism 12 is a rack-and-pinion type mechanism that includes a toothed rack (not shown) and a pinion gear (not shown) located under a gear housing 14. A steering wheel 16 is coupled to an upper steering shaft 18. As the steering wheel 16 is turned, the upper steering shaft 18, which is connected to a lower steering shaft 20 through a universal joint 22, turns the pinion gear. Rotation of the pinion gear moves the toothed rack, which moves tie rods 24 (only one shown) that, in turn, move steering knuckles 26 (only one shown), which turn wheels 28 (only one shown).

EPS assist torque is provided through an assist unit generally indicated by reference numeral 30, which includes a soft-disable controller 32 and an electric motor 34. A motor position sensor 54 is connected to the motor 34 and senses the rotational position of the motor 34. The motor position sensor 54 conveys a signal indicative of the motor position over a signal line 56 to the soft-disable controller 32. The controller 32 is powered by a vehicle power supply 36 through a supply line 38. The controller 32 receives a signal indicative of the vehicle velocity on a signal line 40. Steering pinion gear angle is measured by a position sensor 42 and fed to the controller 32 through a line 44. The position sensor 42 may be an optical-encoding type of sensor, a variable resistance type of sensor, or any other type of position sensor suitable for performing the functions of the position sensor 42.

As the steering wheel 16 is turned, a torque sensor 43 senses the torque applied to the steering wheel 16 by a vehicle operator. The torque sensor 43 may include a torsion bar (not shown) and a variable-resistance type of sensor (not shown) that outputs a variable resistance signal to the controller 32 through a line 46 in relation to the amount of twist on the torsion bar. Other suitable torque-sensing devices that may be used with known signal processing techniques may be substituted in alternate embodiments.

In response to the inputs on lines 40, 44 and 46, the controller 32 sends a command signal through a line 48 to the electric motor 34. The motor 34, in turn, supplies an assist torque to the steering system through a worm 50 and a worm gear 52, in order to provide a steering torque assist to the vehicle steering system in addition to a steering force exerted by the vehicle operator.

Figure 2:
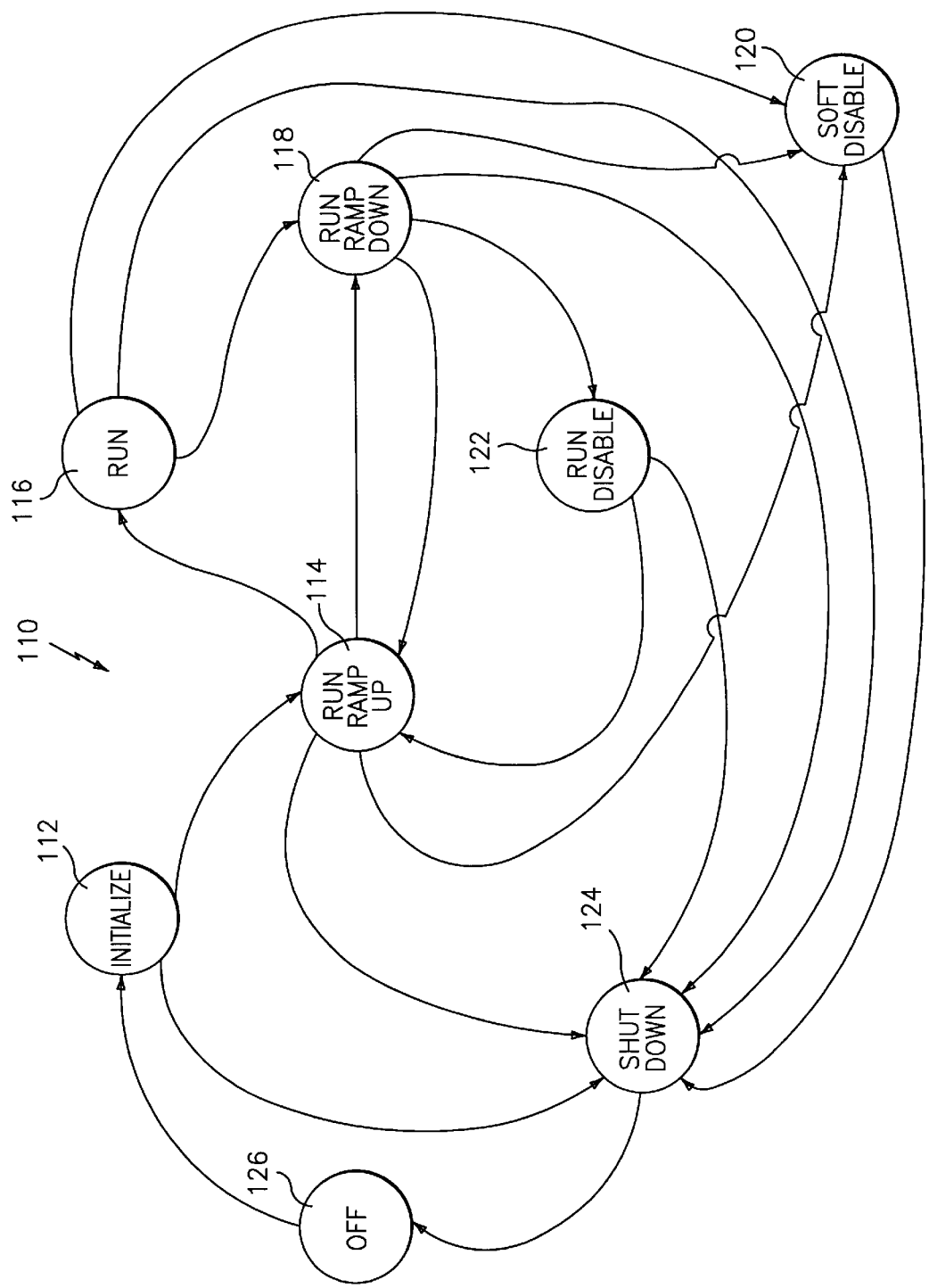
FIG. 2 is a state transition diagram for a portion of the controller of FIG. 1.

As shown in FIG. 2, the EPS system 10 of FIG. 1 has a state transition diagram indicated generally by the reference numeral 110. The state transition diagram 110 includes an initialize state 112, a run ramp-up state 114, a run state 116, a run ramp-down state 118, a soft-disable state 120, a run disable state 122, a shut-down state 124, and an off state 126. The initialize state 112 is entered from the off state 126; and leads to the run ramp-up state 114 and the shutdown state 124. The run ramp-up state 114 is entered from the initialize state 112, the run ramp-down state 118 and the run disable state 122; and leads to the run state 116, the run ramp-down state 118, the soft-disable state 120 and the shut-down state 124. The run state 116 is entered from the run ramp-up state 114; and leads to the run ramp-down state 118, the soft-disable state 120 and the shutdown state 124. The run ramp-down state 118 is entered from the run ramp-up state 114 and the run state 116; and leads to the run ramp-up state 114, the soft-disable state 120, the run disable state 122 and the shut-down state 124.

The soft-disable state 120 is entered from the run ramp-up state 114, the run state 116 and the run ramp-down state 118; and leads to the shutdown state 124. The run disable state 122 is entered from the run ramp-down state 118, and leads to the run ramp-up state 114 and the shut-down state 124. The shut-down state 124 is entered from the initialize state 112, the run ramp-up state 114, the run state 116, the run ramp-down state 118, the soft-disable state 120 and the run disable state 122; and leads to the off state 126. The off state 126 is entered from the shutdown state 124; and leads to the initialize state 112.

For example, the soft-disable state 120 will be entered when a torque signal is determined to be invalid and the system is currently in a state where the outputs are active, i.e., states 114, 116 and 118. The state 120 is exited if an immediate shutdown fault occurs while in the state or if the soft-disable is complete.

Figure 3:
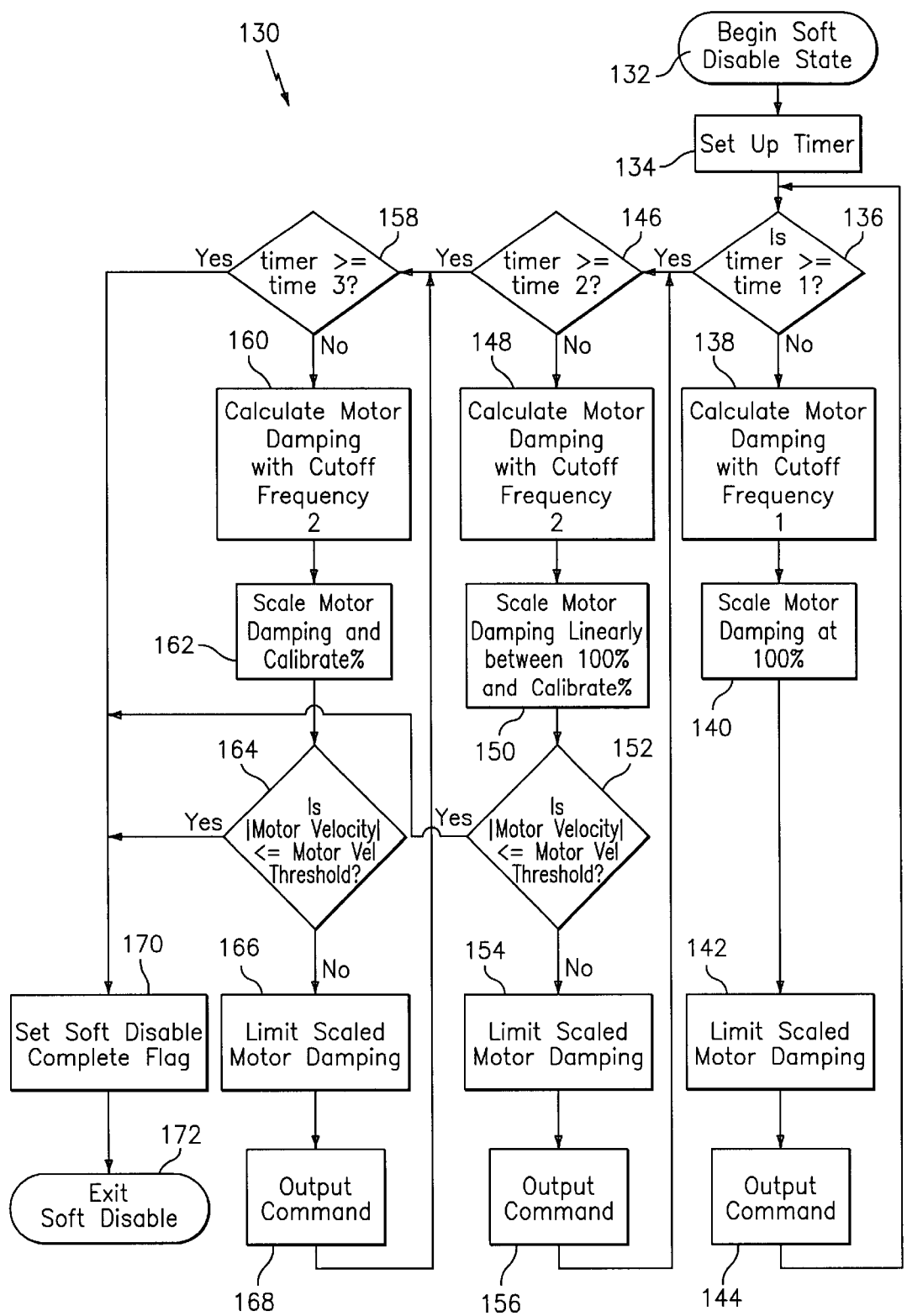
FIG. 3 is a flowchart for a portion of the controller of FIG. 1.

Turning now to FIG. 3, the soft-disable state 120 of FIG. 2 has a flowchart 130. The flowchart 130 includes a step 132 to begin the soft-disable state 120 of FIG. 2, and leads to a step 134 to set up a timer. The step 134 leads to a decision block 136 to check if the timer is greater than or equal to a TIME1. If true, the decision block 136 branches to another decision block 146; and if false, the decision block 136 leads to a step 138. The step 138 calculates motor damping with a first cutoff frequency, and leads to a step 140. The step 140 scales motor damping at 100% and leads to a step 142. The step 142 limits scaled motor damping and leads to a step 144. The step 144 outputs the resulting command and branches back to the decision block 136.

The decision block 146 checks if the timer is greater than or equal to a TIME2. If true, decision block 146 branches to another decision block 158; and if false, decision block 146 leads to a step 148. The step 148 calculates motor damping with a second cutoff frequency, and leads to a step 150. The step 150 scales motor damping linearly between 100% and a calibratable percentage, and leads to a decision block 152. The decision block 152 checks if the absolute value of Motor Velocity is less than or equal to a MOTOR_VELOCITY_THRESHOLD. If true, decision block 152 branches to a step 170; and if false, decision block 152 leads to a step 154. The step 154 limits the scaled motor damping and leads to a step 156. The step 156 outputs the resulting command and branches back to the decision block 146.

The decision block 158 checks if timer is greater than or equal to a TIME3. If true, the decision block 158 branches to the step 170; and if false, the decision block 158 leads to a step 160. The step 160 calculates motor damping with the second cutoff frequency, and leads to a step 162. The step 162 scales motor damping at the calibratable percentage, and leads to a decision block 164. The decision block 164 checks if the absolute value of Motor Velocity is less than or equal to the MOTOR_VELOCITY_THRESHOLD. If true, the decision block 164 branches to the step 170; and if false, the decision block 164 leads to a step 166. The step 166 limits the scaled motor damping, and leads to a step 168. The step 168 outputs the resulting command, and branches back to the decision block 158. The step 170 sets a soft-disable complete flag, and leads to a step 172. The step 172 exits the soft-disable state 120 of FIG. 2.

In operation, a free running timer is set up that increases with time. While the timer is less than TIME1, the motor damping is calculated with the first cutoff frequency, scaled at 100%, limited to a maximum value, and applied to the motor as the motor command. While the timer is greater than TIME1 but less than TIME2, the motor damping is calculated with the second cutoff frequency. If the absolute value of motor velocity is greater than a calibratable motor velocity, the motor damping is scaled linearly between 100% and a calibratable percentage, limited to a maximum value, and applied to the motor as the motor command. If the absolute value of motor velocity is less than or equal to a calibratable motor velocity, the soft-disable state is exited. It shall be noted that the computation block 150 may fall before or after the decision block 152 in alternate embodiments, depending on design choices of computational economy.

When the timer is greater than TIME2 and less than TIME3, the motor damping is calculated with the second cutoff frequency. If the absolute value of motor velocity is greater than a calibratable motor velocity, the motor damping is scaled by a calibratable percentage, limited to a maximum value, and applied to the motor as the motor command. If the absolute value of motor velocity is less than or equal to a calibratable motor velocity, the soft-disable state is exited. If time is greater than or equal to TIME3, the soft-disable state is also exited.

The scaled motor damping is limited to a maximum value so that the damping produced by the motor command can be substantially guaranteed to be less than a desired number of Newton meters of torque. The motor velocity is compared to a calibratable motor velocity so that the soft-disable state can be exited as quickly as possible when the motor velocity falls below a calibratable motor velocity after time is greater than TIME1. Waiting until after TIME1 allows the motor enough time for the motor velocity to rise above the calibratable motor velocity before checking to see if the motor velocity has fallen below a calibratable value. A suitable TIME1 is defined by the physical dynamics of the EPS system 10, and may be determined experimentally.

The motor damping is scaled as a function of time. Having a motor damping that is scaled with time allows for a higher initial motor command that will slow the back-driven motor faster. After the initial motor command, the motor damping scale factor is decreased with time to a minimum value. This helps the driver while performing an evasive maneuver by reducing the motor command and also prevents the back-driven motor from being slowed too much.

Figure 4:
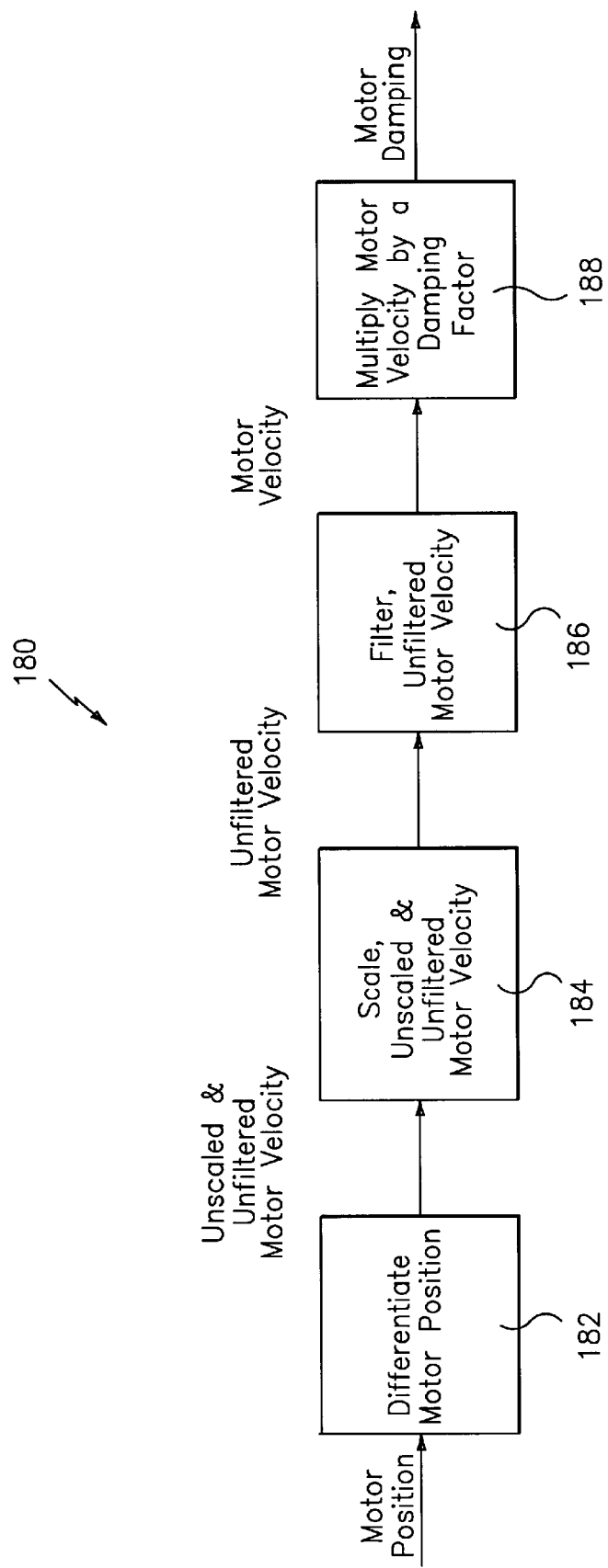
FIG. 4 is a block diagram for a portion of the controller of FIG. 1.

As shown in FIG. 4, a damping function 180 receives a signal indicative of motor position at differentiator 182, which differentiates the motor position to obtain an unscaled and unfiltered motor velocity, and is connected to a scaler 184. The scaler 184 scales the unscaled and unfiltered motor velocity from the differentiator 182, and is connected to a filter 186. The filter 186 filters the unfiltered motor velocity from the scaler 184, and is connected to a multiplier 188. The multiplier 188 multiplies the motor velocity from the filter 186 by a damping factor to produce a signal representative of the desired motor damping.

Thus, the motor position input is used as the feedback signal to limit the back-driven motor velocity during the soft-disable state. Since the exemplary EPS system does not have a true motor velocity signal, the motor velocity is calculated from the motor position input. The motor position input is then differentiated, scaled, and filtered to calculate motor velocity. In alternate embodiments, the motor velocity signal may be measured directly and used as a feedback signal.

The motor velocity is then multiplied by a damping factor to calculate motor damping, which, in turn, is multiplied by a scale factor to produce a scaled motor damping. The scaled motor damping is limited and applied to the motor as a motor command. The motor command causes the motor to apply torque in the direction opposite to that in which the motor is moving. This limits the velocity at which the motor is being back-driven and eliminates or minimizes the abruptly increased reaction torque that the driver would otherwise feel.

Figure 5:
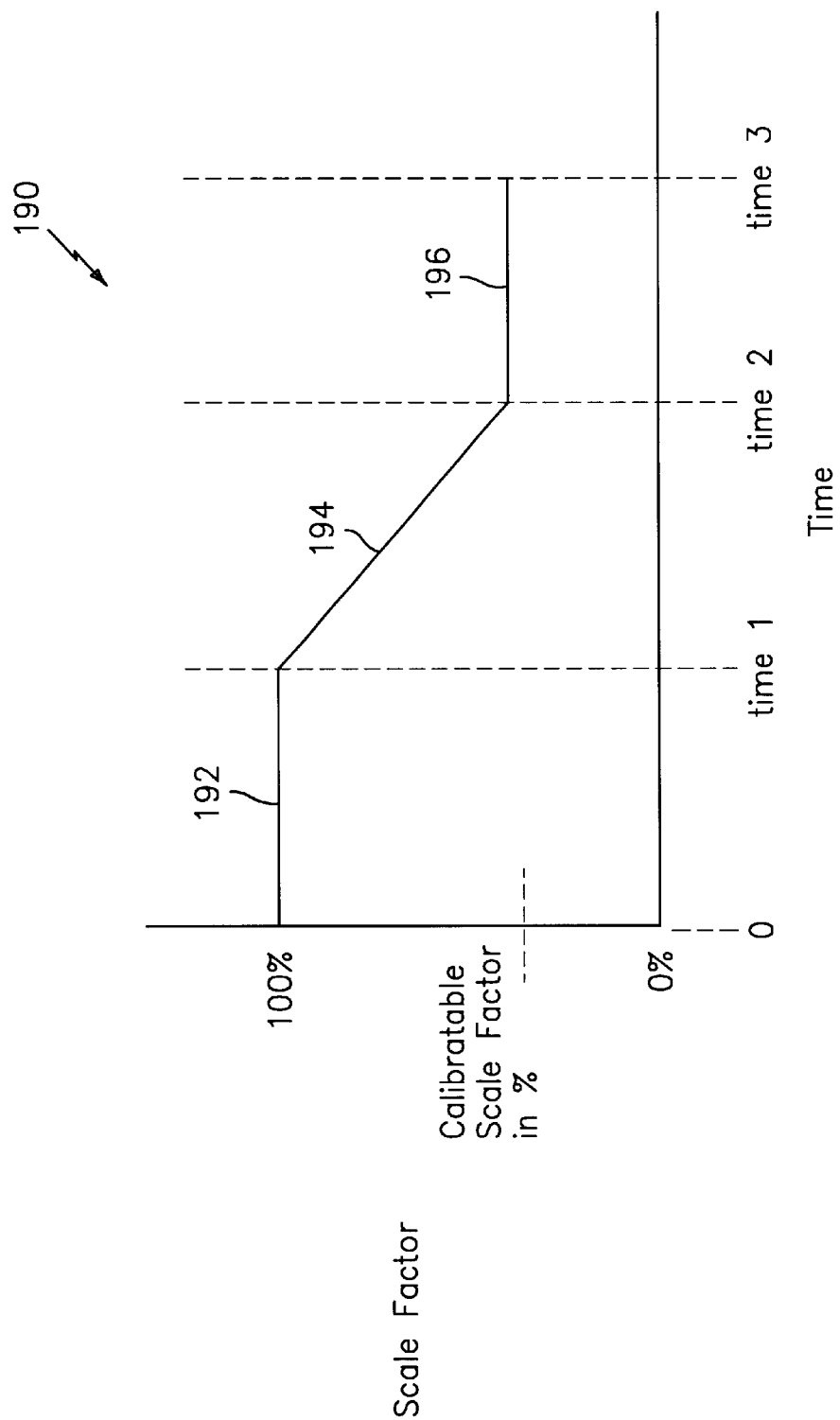
FIG. 5 is a time-wise plot of motor damping scale factor for a portion of the controller of FIG. 1.

Turning now to FIG. 5, the motor damping for the exemplary embodiment is scaled as shown by the graph indicated generally by reference numeral 190. From time zero to time less than TIME1, the motor damping is scaled by a 100% scaling factor 192. From TIME 1 to TIME 2, the damping is scaled linearly between 100% and a calibratable scale factor percentage for a scaled motor damping value 194. From time greater than TIME 2 to TIME 3, the motor damping is scaled according to the calibratable scale factor percentage for scaled motor damping value 196. Thus, the scaled motor damping described with reference to FIGS. 3 and 4 is a discretized piecewise-continuous function of time.

Due to the relatively high speed at which the motor is initially back-driven, the low-pass filter that calculates the motor velocity, filter 186 of FIG. 4, requires a relatively high cutoff frequency in order to quickly converge on the signal indicating the high speed. Because of low resolution on the motor position signal and a high sampling rate, converting the motor position signal to a motor velocity requires a high gain at scaler 184 of FIG. 4. The combination of a high cutoff frequency and a high gain results in ripple that might be felt in the hand wheel. To overcome this ripple, the low pass filter 186 has two cutoff frequencies that are changed at different times. From time less than TIME1, a relatively high cutoff frequency was chosen (the first cutoff frequency or "cutoff frequency 1"). From time greater than or equal to TIME1, a lower cutoff frequency was chosen (the second cutoff frequency or "cutoff frequency 2"). Using two cutoff frequencies allows for the fast response needed initially and also helps to mitigate the ripple felt in the hand wheel once the motor starts to slow down.

The soft-disable state 120 of FIG. 2 is entered for a very short period of time. The state is entered long enough to mitigate the effects of the abruptly increased reaction torque. To determine the duration of time that the motor damping in the soft-disable state 120 is applied requires analyzing different types of driving conditions for both the effects of the motor being back-driven and the damping that is added to the motor. The motor is back-driven with the highest velocity when the motor is applying maximum assist torque and an immediate shutdown fault occurs. Maximum assist torque is applied under worst-case steering loads.

The worst-case steering loads typically occur near the ends of steering rack travel; and thus, the motor is typically back-driven the hardest near the ends of steering rack travel. Based upon experimentation, the area where a driver may feel added damping is while performing an evasive lane change while going straight down the road. Therefore a tradeoff must be made between the cases involving the ends of steering rack travel and those involving an evasive lane change maneuver. Longer periods of time are desired to minimize the abruptly increased reaction torque at the end of travel while shorter periods of time are desired to minimize the damping while driving straight. If the tradeoff between end of travel and evasive lane change is well matched, neither the abruptly increased reaction torque near the end of travel nor the damping during an evasive lane change will be noticed by a driver. Thus, embodiments of the soft-disable controller provide a controlled level of damping torque rather than merely an abrupt discontinuation of assist torque.

Another input that could be used to help in the tradeoff between end of travel and an evasive lane change is vehicle speed. Because the steering loads are highest statically and at low vehicle speeds, the duration of time that the soft-disable is run could be decreased as vehicle speed increases up to some minimum threshold of time. Adding the vehicle speed input could help to achieve a well-matched tradeoff in alternate embodiments.

While the invention has been described with reference to exemplary embodiments, it will be understood by those of ordinary skill in the pertinent art that various changes may be made and equivalents may be substituted for the elements thereof without departing from the scope of the disclosure. In addition, numerous modifications may be made to adapt the teachings of the disclosure to a particular object or situation without departing from the essential scope thereof. Therefore, it is intended that the Claims not be limited to the particular embodiments disclosed as the currently preferred best modes contemplated for carrying out the teachings herein, but that the Claims shall cover all embodiments falling within the true scope and spirit of the disclosure.

What is claimed is:

1. A method for controlling an electric power steering system comprising:

commanding a motor to provide an assist torque; and providing a soft-disable damping torque in signal communication with said motor for reducing increased reaction torque when said assist torque is removed.

2. A method as defined in claim 1, further comprising:

receiving a signal indicative of motor velocity; and adjusting the soft-disable damping torque in correspondence with said received signal.

3. A method as defined in claim 2 further comprising:

timing the duration of said soft-disable damping torque; and scaling the soft-disable damping torque in discretized piecewise-continuous correspondence with said timing.

4. A method as defined in claim 3, further comprising:

controlling said motor in correspondence with said scaled damping torque.

5. A method as defined in claim 1 further comprising:

receiving a signal indicative of motor position; and adjusting the soft-disable damping torque in correspondence with said received signal.

6. A method as defined in claim 5, said adjusting comprising:

differentiating the signal indicative of motor position to provide a signal indicative of motor velocity;

scaling the signal indicative of motor velocity;

filtering the scaled signal; and multiplying the filtered signal by a damping factor to produce a signal indicative of motor damping.

7. A method as defined in claim 1, further comprising:

scaling a signal indicative of motor damping; and limiting the scaled signal indicative of motor damping to provide a command signal; and controlling said motor in correspondence with said command signal.

* * * * *